(12) United States Patent
Jiang et al.

(10) Patent No.: US 7,957,433 B2
(45) Date of Patent: Jun. 7, 2011

(54) MODE-LOCKED TWO MICRON FIBER LASERS

(75) Inventors: Shibin Jiang, Tucson, AZ (US); Qing Wang, Tucson, AZ (US); Jihong Geng, Tucson, AZ (US); Tao Luo, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 24 days.

(21) Appl. No.: 12/509,406

(22) Filed: Jul. 24, 2009

(65) Prior Publication Data
US 2011/0019700 A1    Jan. 27, 2011

(51) Int. Cl.
*H01S 3/30*   (2006.01)
*H01S 3/098*  (2006.01)

(52) U.S. Cl. ............................................. 372/6; 372/18
(58) Field of Classification Search .............. 372/6, 18, 372/64, 68
See application file for complete search history.

(56) References Cited

U.S. PATENT DOCUMENTS
6,510,167 B1 * 1/2003 Jain et al. .......................... 372/6
7,106,762 B1 * 9/2006 Jiang et al. ........................ 372/6
* cited by examiner

*Primary Examiner* — Armando Rodriguez
(74) *Attorney, Agent, or Firm* — Dale F. Regelman; Quarles & Brady LLP

(57) ABSTRACT

A mode-locked fiber laser comprising a multicomponent glass fiber doped with a trivalent rare-earth ion of thulium and/or holmium.

7 Claims, 3 Drawing Sheets

MODE-LOCKED TWO MICRON FIBER LASERS

GOVERNMENT RIGHTS

The U.S. Government has a paid-up license in this invention and the right in limited circumstances to require the patent owner to license others on reasonable terms as provided for by the terms of Contract No. DE-FG02-08ER85029.

INCORPORATION BY REFERENCE

This application incorporates by reference U.S. patent application Ser. No. 12/113,865, filed May 1, 2008, entitled Thulium and/or Holmium Doped Silicate Glasses for Two Micron Lasers, in its entirety for all purposes.

FIELD OF THE INVENTION

Various implementations, and combinations thereof, are related to mode-locked fiber lasers, and more particularly to mode-locked fiber lasers near 2 micron wavelength for producing picosecond and femtosecond pulses.

BACKGROUND OF THE INVENTION

Generally speaking, a mode-locked laser refers to a laser where all the longitudinal modes in the laser cavity are phase locked or mode-locked, which is a technique that can be used to produce extremely short duration laser pulses on the order of picoseconds ($10^{-12}$ s) or femtoseconds ($10^{-15}$ s). Because high peak power can be achieved due to the extremely short pulse duration, mode-locked lasers can be used for a variety of applications, including materials processing, spectroscopy, sensing, medicine, and light generation through optical nonlinearity.

Mode-locked fiber lasers are a specific type of mode-locked lasers comprising a doped fiber as a gain medium. Typically, a gain fiber comprising a length of several meters is used because of the relatively low gain per unit length of doped silica fiber. Furthermore, when a gain fiber comprising a length of several meters is used, the repetition rate of a pulse train of the mode-locked fiber laser is limited to approximately 100 MHz.

SUMMARY OF THE INVENTION

In one implementation, a mode-locked fiber laser is presented. The mode-locked fiber laser comprises a multicomponent glass fiber doped with a trivalent rare-earth ion of thulium and/or holmium.

In another implementation, a mode-locked fiber laser is presented. The mode-locked fiber laser comprises a multicomponent glass fiber doped with a trivalent rare-earth ion of thulium and/or holmium, wherein that multicomponent glass fiber comprises a refractive index greater than about 1.55.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

Implementations propose a mode-locked fiber laser capable of achieving a high repetition rate of pulse train near 2 micron, wherein the repetition rate of the pulse train can be increased to several gigahertz by using multicomponent trivalent thulium (Tm) or Holmium (Ho) doped fiber. Throughout the following description, this invention is described in preferred embodiments with reference to the figures in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment, "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention includes mode-locked fiber laser having a multicomponent trivalent thulium ($Tm^{3+}$) and/or Holmium ($Ho^{3+}$) doped fiber. More specifically, Applicants' invention comprises a multicomponent glass fiber comprising high concentrations of $Tm^{3+}$ and $Ho^{3+}$ ions, thereby facilitating use of a shorter length $Tm^{3+}$ or $Ho^{3+}$ doped fiber portion in Applicants' mode-locked fiber laser with respect to prior art devices. Applicants' mode-locked fiber laser comprising a gain fiber comprising a reduced length necessarily comprises a fiber cavity comprising a reduced length which results in a higher repetition rate of pulse train.

Figure 1:
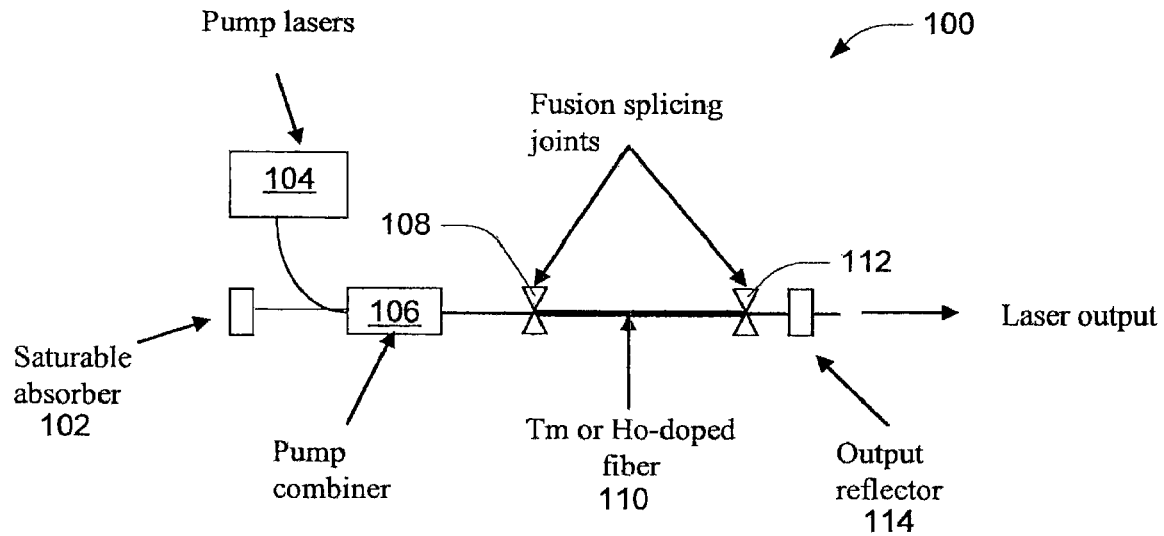
FIG. 1 is a schematic diagram of Applicants' mode-locked 2 micron fiber laser.

Turning now to FIG. 1, a schematic diagram is for an exemplary mode-locked 2 micron fiber laser 100 is presented. As can be seen in the illustrated embodiment of FIG. 1, a $Tm^{3+}$ or $Ho^{3+}$ doped fiber 110 is fusion spliced with a pump combiner 106 and an output reflector 114. As will be understood by one of ordinary skill in the art, fusion splicing is the act of joining two optical fibers end-to-end using heat in such a manner that light passing through the fibers is not scattered or reflected back by the splice. In the illustrated embodiment of FIG. 1, the fusion splicing joints are labeled 108 and 112.

As will also be understood by one of ordinary skill in the art, a pump combiner increases the power of a laser, such as pump laser 104. In certain embodiments, pump laser 104 is a single mode diode laser. In certain embodiments, pump laser 104 is a multi-mode diode laser. In certain embodiments, pump laser 104 emits a wavelength substantially equal to 790 nm, wherein by "substantially equal to" Applicants' mean within ten percent (10%).

The exemplary mode-locked 2 micron fiber laser 100 of FIG. 1, further includes saturable absorber 102. As will be appreciated by one of ordinary skill in the art, a saturable absorber comprises an optical component wherein an absorption of light decreases with increasing light intensity, particularly at high optical intensities. In certain embodiments, saturable absorber 102 is passive. In certain embodiments, saturable absorber 102 is active. In certain embodiments, saturable absorber 102 is a semiconductor saturable mirror with a high reflectivity coating near 2 microns at the back of the saturable absorber layers. In certain embodiments, saturable absorber 102 has a refractive coating.

In the illustrated embodiment of FIG. 1, output reflector 114 is depicted at the end of fiber 110. In other embodiments, output reflector 114 is deposited at the end of a gain fiber. In certain embodiments, output reflector 114 is a broad band fiber Brag grating. In certain embodiments, output reflector 114 is a dielectric coating at an end of fiber 110. In certain embodiments, output reflector 114 is a fiber loop mirror.

It will be appreciated by one of ordinary skill in the art that FIG. 1 is illustrative and is not intended to limit the arrangement of optical components or the type of pump laser used with Applicants' invention.

Figure 2:
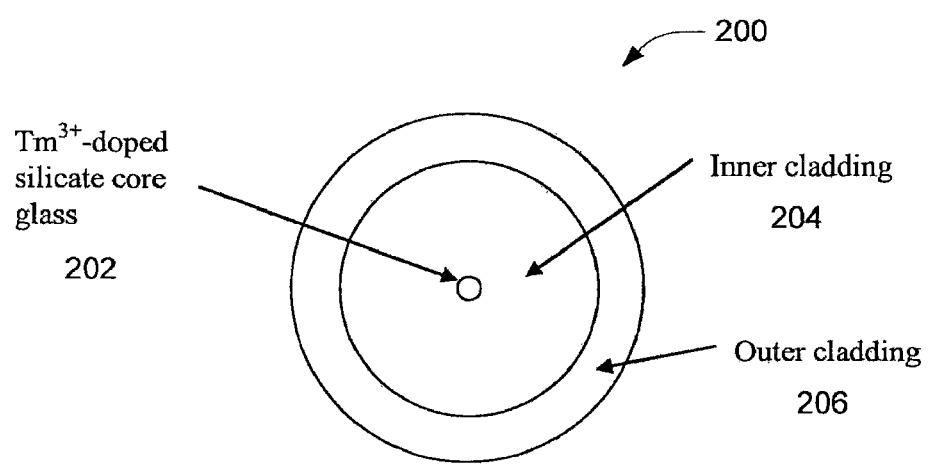
FIG. 2 is a cross sectional view of an exemplary thulium doped double cladding fiber.

Turning now to FIG. 2, an exemplary embodiment of a double cladding fiber 200 for use with Applicants' mode-locked 2 micron fiber laser is presented. In the illustrative embodiment of FIG. 2, fiber 200 is shown having a core 202, an inner cladding 204, and an outer cladding 206. Core 202 is illustrated as being doped with $Tm^{3+}$. In certain embodiments, core 202 is doped with $Ho^{3+}$. In certain embodiments, core 202 is co-doped with $Tm^{3+}$ and $Ho^{3+}$.

Furthermore, fiber 200 comprises a glass network former, intermediates, and modifiers. As will be understood by one of ordinary skill in the art, the network structure of glass allows for the accommodation of different types of atoms which can significantly change the properties of the glass. Cations can act as network modifiers, disrupting the continuity of the network, or as formers, which contribute to the formation of the network. Network formers have a valence greater than or equal to three and a coordination number not larger than four. Network intermediates have a lower valence and higher coordination number than network formers.

In certain embodiments, fiber 200 is an oxide multicomponent glass. In such embodiments, fiber 200 may, by way of example and not limitation, be silicate glass, germanate glass, phosphate glass, borate glass, tellurite glass, bismuth glass, or aluminate glass. In such embodiments, fiber 200 may, by way of example and not limitation, have a glass former network of $SiO_2$, $GeO_2$, $P_2O_5$, $B_2O_3$, $TeO_2$, $Bi_2O_3$, or $Al_2O_3$. In certain embodiments, fiber 200 is a non-oxide multicomponent glass. In such embodiments, fiber 200 may, by way of example and not limitation, be fluoride glass or chalcogenide glass.

In certain embodiments, fiber 200 comprises an oxide glass network intermediate, such as, by way of example and not limitation, aluminum oxide or boron oxide.

In certain embodiments, fiber 200 comprises an alkali ion glass network modifier. In such embodiments, the glass network modifier comprises, by way of example and not limitation, $Li^+$, $Na^+$, or $K^+$. In certain embodiments, fiber 200 comprises an alkaline earth ion glass network modifier. In such embodiments, the glass network modifier comprises, by way of example and not limitation, $Mg^{2+}$, $Ca^{2+}$, or $Ba^{2+}$. In certain embodiments, fiber 200 comprises a transition metal ion glass network modifier. In such embodiments, the glass network modifier comprises, by way of example and not limitation, $Zn^{2+}$ or $Y^{3+}$.

Applicants' mode-locked 2 micron fiber laser comprising Applicants' multicomponent glass 200 differs from to prior art silica glass devices for several reasons. The content of the glass modifier differs between silica glass and Applicants' multicomponent glass. Silica glass is not a multicomponent glass, but rather typically comprises pure $SiO_2$ without any appreciable glass network modifier. Silica glass can be modified, however, using $GeO_2$, $P_2O_2$, $B_2O_3$, and $Al_2O_3$. Significantly however, when the content of the modifier exceeds about 1 weight percent, the properties of the modified silica glass, including physical, chemical, mechanical, and thermal properties, change dramatically.

The concentration of rare-earth ion doping in Applicants' multicomponent glass is much higher than the ion doping possible using silica glass. The glass network modifiers present in Applicants' multicomponent glass, such as sodium ions, potassium ions, barium ions, and calcium ions, disrupt a well-defined glass network of silica, thereby producing sites for rare-earth ions. As a result more than 10 weight percent of rare earth ions can be doped into Applicants' multicomponent glass, while the doping concentration of silica glass is typically limited to 1 weight percent. A high doping concentration of rare-earth ions in Applicants' laser glass enables enhanced laser performance.

In addition, the refractive index of Applicants' laser glass can be adjusted by changing the glass composition. Such changes to the refractive index vary a zero dispersion wavelength of the glass. A zero dispersion wavelength near 2 microns facilitates generation of a short pulse within a 2 micron mode-locked fiber laser. Applicants' have found that by adjusting the refractive index of Applicants' laser glass to greater than 1.55 at 589 nm, a zero dispersion near 2 microns can be achieved. The refractive index of silica glass at 589 nm is less than 1.50.

Another benefit can be seen in the fabrication of multicomponent glass fiber versus silica fiber. Applicants' rare-earth doped multicomponent glass fiber is fabricated using a rod-in-tube technique. A core glass rod is drilled from rare-earth doped bulk glass, ground, and polished. A tube is then fabricated from undoped bulk glass, which comprises a lower refractive index than the core glass. A fiber perform is then formed by inserting the rod into the polished tube, which is pulled into fiber at an elevated temperature on a fiber drawing tower.

In contrast, rare-earth doped silica fiber typically is fabricated with chemical vapor deposition (CVD). When a sufficient amount of rare-earth doped silica vapor has been deposited inside of a silica glass tube, the tube is heated and collapsed around the deposited rare-earth doped silica. The doped silica becomes the core and the undoped silica the cladding.

A mode-locked fiber laser using doped silica fiber produced a repetition rate of the pulse train limited to approximately 100 MHz, thereby limiting the usefulness of the laser. The power of a mode-locked fiber laser increases linearly with the repetition rate. Furthermore, because of the extremely short pulse width, the optical nonlinearity sets an upper limit for high power mode-locked fiber lasers. Thus, a higher repetition rate produces a higher average output power.

Applicants' mode-locked fiber laser comprises a $Tm^{3+}$ or $Ho^{3+}$ doped multicomponent glass fiber. In certain embodiments, the active laser ion is $Tm^{3+}$ and the multicomponent fiber is doped with $Tm^{3+}$, resulting in emissions from 1.75 microns to 2.05 microns. In certain embodiments, $Ho^{3+}$ is used as the laser active ion. In such embodiments, the multicomponent glass fiber can be singly doped with $Ho^{3+}$ or co-doped with $Ho^{3+}$ and $Tm^{3+}$. When co-doped, the $Tm^{3+}$ ions are energetically pumped, and transfer energy to the $Ho^{3+}$ ions.

Applicants' mode locked fiber laser comprises a $Ho^{3+}$ doped and/or $Tm^{3+}$ doped multicomponent gain fiber, thus allowing for the reduction of the length of the multicomponent fiber to several centimeters. As will be appreciated by one of ordinary skill in the art, the relationship between the pulse repetition rate of a mode-locked fiber laser and the length of the multicomponent fiber is provided by:

Pulse Repetition Rate=$c/2L$ wherein c is the speed of light and L is the length of the fiber laser cavity. Therefore, when the gain fiber length is 1.5 meters the pulse repetition rate is about 100 MHz. However, when the fiber cavity length is reduced to 10 cm, the pulse repetition rate increases to about 1.5 GHz. In certain embodiments, Applicants' fiber laser has a repetition rate between 0.1 GHz and 20 GHz. In such embodiments, the length of the multicomponent fiber is between 0.75 cm and 150 cm. In certain embodiments, Applicants' fiber laser has a repetition rate between 0.2 GHz and 15 GHz. In such embodiments, the length of the multicomponent fiber is between 1.0 cm and 75 cm. In certain embodiments, Applicants' fiber laser has a repetition rate between 0.5 GHz and 10 GHz. In such embodiments, the length of the multicomponent fiber is between 1.5 cm and 30 cm.

In one embodiment, a $Tm^{3+}$ doped silicate glass fiber is fabricated having the parameters recited in Table 1. The doping concentration is 5 weight percent of $Tm_2O_3$. The fiber comprises a double cladding with the diameters of the core, first cladding, and second cladding being 10, 125, and 164 microns, respectively. The numerical aperture of the core and inner cladding are 0.136 and 0.581 respectively.

TABLE 1

| Glasses | Refractive Index at 589 nm | Doping | Numerical Aperture | Core (μm) | Cladding Diameter. (μm) |
|---|---|---|---|---|---|
| S-G-23 | 1.633 | 5 wt % $Tm_2O_3$ | 0.136 | 10 | |
| First Cladding | 1.6273 | | 0.581 | | 125 |
| Second Cladding | 1.5233 | | | | 164 |

The above-described double cladding gain fiber may be utilized where the pump source is a multimode 800 nm diode laser delivered with a 125 micron core fiber. In such an embodiment, the inner cladding of the $Tm^{3+}$ doped silicate glass fiber matches the 125 micron core pump deliver fiber.

Figure 3:
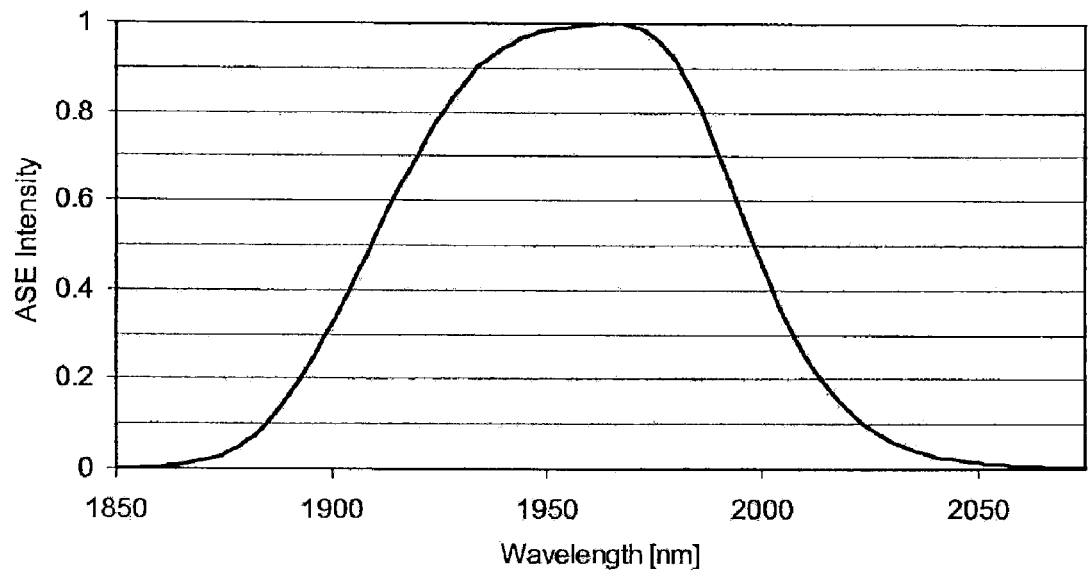
FIG. 3 is a exemplary spectrum of amplified spontaneous emission of thulium ions.

FIG. 3 graphically illustrates an amplified spontaneous emission (ASE) of $Tm^{3+}$ ions versus wavelength. By pumping different lengths of Applicants' above-described gain fibers with different intensities, emissions from 1.75-2.05 microns can be realized.

Figure 4:
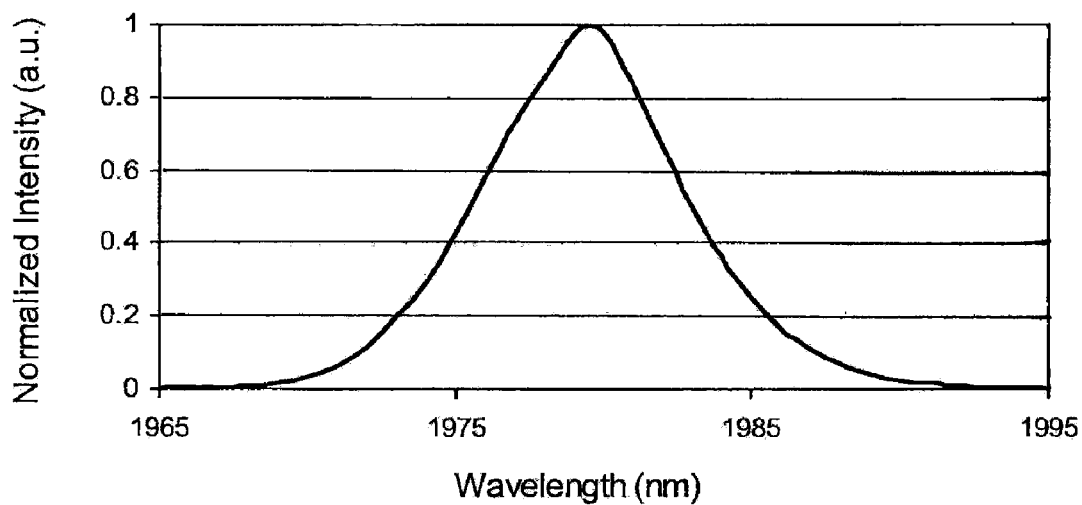
FIG. 4 is an exemplary spectrum of a mode-locked 2 micron fiber laser according to the present invention.

FIG. 4 graphically illustrates a laser spectrum of a mode-locked near 2 microns fiber laser using $Tm^{3+}$ doped silicate glass fiber.

Table 2 recites parameters of a $Tm^{3+}/Ho^{3+}$ co-doped silicate glass fiber. The doping concentration is 6 weight percent $Tm_2O_3$ and 1 weight percent $Ho_2O_3$. The fiber comprises a double cladding with the diameters of the core, first cladding, and second cladding being 10.5, 122, and 160 microns, respectively. The numerical aperture of the core and inner cladding are 0.147 and 0.557 respectively.

TABLE 2

| Glasses | Refractive Index at 589 nm | Doping | Numerical Aperture | Core (μm) | Cladding Diameter. (μm) |
|---|---|---|---|---|---|
| S-G-25 | 1.6294 | 6 wt % $Tm_2O_3$ & 1 wt % $Ho_2O_3$ | 0.149 | 10.5 | |
| First Cladding | 1.6226 | | 0.557 | | 122 |
| Second Cladding | 1.5233 | | | | 160 |

Figure 5:
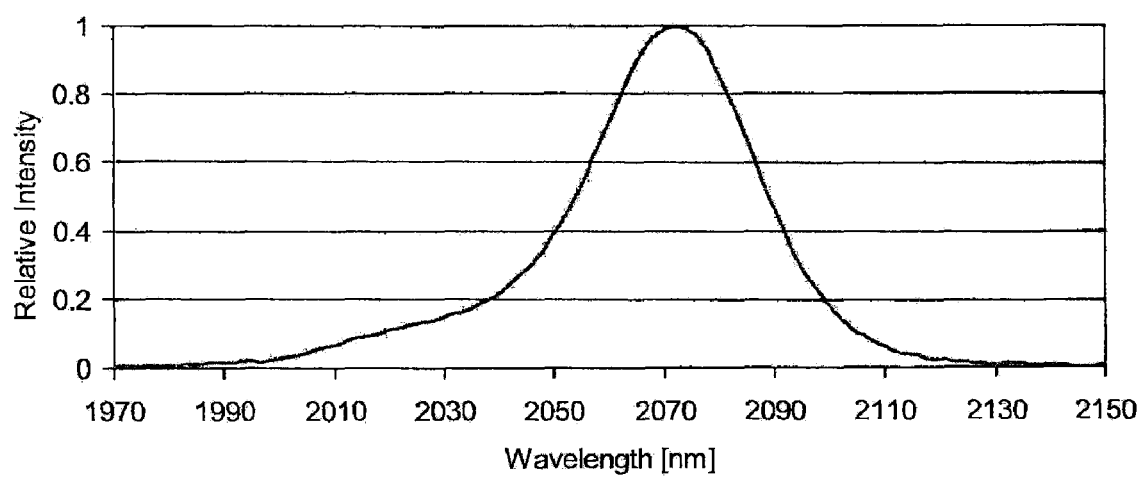
FIG. 5 is an exemplary spectrum of the amplified emission of holmium ions in a thulium/holmium co-doped fiber according to the present invention.

FIG. 5 graphically illustrates an amplified spontaneous emission of $Ho^{3+}$ ions versus wavelength. Emission from 1.90 microns to 2.20 microns can be realized using $Ho^{3+}$ doped fiber when different lengths of gain fibers are used with different pump intensities.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

While the preferred embodiments of the present invention have been illustrated in detail, it should be apparent that modifications and adaptations to those embodiments may occur to one skilled in the art without departing from the scope of the present invention as set forth in the following claims.

We claim:

1. A mode-locked fiber laser, comprising a multicomponent glass fiber doped with a trivalent rare-earth ion selected from the group consisting of thulium and holmium, having a length between 0.75 cm and 150 cm, wherein a pulse repetition rate is between 0.1 GHz and 20 GHz.

2. The mode-locked fiber laser of claim 1, wherein the length is between 1.0 cm and 75 cm, wherein the pulse repetition rate is between 0.2 GHz and 15 GHz.

3. The mode locked fiber laser of claim 2, wherein the length is between 1.5 cm and 30 cm, wherein the pulse repetition rate is between 0.5 GHz and 10 GHz.

4. The mode-locked fiber laser of claim 1, further comprising:
   one or more network formers selected from the group consisting of:
   $SiO_2$;
   $GeO_2$;
   $P_2O_5$;
   $B_2O_3$; and
   $Al_2O_3$;
   a network intermediate; and
   a network modifier.

5. The mode-locked fiber laser of claim 4, wherein the network intermediate comprises one or more of $B_2O_3$ and $Al_2O_3$.

6. The mode-locked fiber laser of claim 5, wherein the network modifier is selected from the group consisting of an alkali ion, an alkaline earth ion, and a transition metal ion.

7. The mode-locked fiber laser of claim 1, wherein the multicomponent glass fiber comprises a refractive index greater than 1.55.

* * * * *